(12) United States Patent
Labat et al.

(10) Patent No.: US 8,589,557 B1
(45) Date of Patent: Nov. 19, 2013

(54) AUTOMATIC PROVISIONING OF RESOURCES TO SOFTWARE OFFERINGS

(75) Inventors: Jerome Labat, San Carlos, CA (US);
Ramachandran Varadharajan, Fremont, CA (US); Wilson W. Lau, San Francisco, CA (US); Thomas C. Bishop, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 230 days.

(21) Appl. No.: 13/031,968

(22) Filed: Feb. 22, 2011

(51) Int. Cl.
*G06F 15/173* (2006.01)

(52) U.S. Cl.
USPC .............................. 709/226; 718/104; 717/120

(58) Field of Classification Search
USPC .......... 709/226; 717/120–121, 178, 100–101; 718/104
See application file for complete search history.

(56) References Cited

U.S. PATENT DOCUMENTS

| | | | |
|---|---|---|---|
| 8,091,065 B2 * | 1/2012 | Mir et al. | 717/104 |
| 2004/0177244 A1 * | 9/2004 | Murphy et al. | 713/100 |
| 2004/0205101 A1 * | 10/2004 | Radhakrishnan | 709/200 |
| 2006/0259606 A1 * | 11/2006 | Rogers et al. | 709/223 |
| 2008/0066048 A1 * | 3/2008 | Hafermann et al. | 717/100 |
| 2008/0066049 A1 * | 3/2008 | Jain et al. | 717/101 |
| 2009/0307685 A1 * | 12/2009 | Axnix et al. | 717/174 |
| 2012/0117625 A1 * | 5/2012 | Ray | 726/4 |
| 2012/0204187 A1 * | 8/2012 | Breiter et al. | 718/105 |

* cited by examiner

*Primary Examiner* — Abdullahi Salad
(74) *Attorney, Agent, or Firm* — Park, Vaughan, Fleming & Dowler, LLP; Chia-Hsin Suen

(57) ABSTRACT

The disclosed embodiments provide a system that facilitates the deployment and execution of a software offering. During operation, the system obtains a service definition of the software offering. Next, the system creates a work-breakdown structure based on a set of policies from the service definition. Finally, the system uses the work-breakdown structure to automatically provision a set of resources for use by the software offering without requiring manual configuration of the resources by a user.

19 Claims, 6 Drawing Sheets

AUTOMATIC PROVISIONING OF RESOURCES TO SOFTWARE OFFERINGS

RELATED APPLICATION

The subject matter of this application is related to the subject matter in a co-pending non-provisional application by the same inventors as the instant application and filed on the same day as the instant application, entitled "Multidimensional Modeling of Software Offerings," and having Ser. No. 13/031,950.

BACKGROUND

Related Art

The present embodiments relate to techniques for managing software offerings. More specifically, the present embodiments relate to techniques for automatically provisioning resources to software offerings.

Recent computing trends have shifted the processing and consumption of data and services to cloud computing systems. Such cloud computing systems allow software providers to deploy, execute, and manage software offerings on shared infrastructure resources such as servers, network equipment, platform-virtualization software, and/or datacenter space. Furthermore, such resources may be dynamically provisioned and/or scaled, thus enabling consumption of the resources as services.

For example, a cloud computing provider may provide virtualized storage, network, and/or computing resources to multiple cloud computing customers. The cloud computing customers may deploy software offerings on the virtualized resources and pay the cloud computing provider only for resources consumed by the software offerings. As a result, the cloud computing customers may avoid capital expenditures associated with purchasing, setting up, and/or managing the underlying hardware and software. Furthermore, the centralization and sharing of infrastructure resources may improve the resources' utilization rates and management overhead.

Hence, the deployment, execution, and management of software offerings may be facilitated by mechanisms for dynamically allocating and configuring infrastructure resources used by the software offerings.

SUMMARY

The disclosed embodiments provide a system that facilitates the deployment and execution of a software offering. During operation, the system obtains a service definition of the software offering. Next, the system creates a work-breakdown structure based on a set of policies from the service definition. Finally, the system uses the work-breakdown structure to automatically provision a set of resources for use by the software offering without requiring manual configuration of the resources by a user.

In some embodiments, each of the set of policies is at least one of a software-development-lifecycle policy, a security policy, a software-template policy, a quality-of-service (QoS) policy, and a structural policy.

In some embodiments, creating the work-breakdown structure based on the set of policies involves determining a set of requirements associated with the software offering from the set of policies, and storing the requirements in a tree structure.

In some embodiments, using the work-breakdown structure to automatically provision the set of resources for use by the software offering involves creating a set of service containers for hosting the software offering, and allocating resources to the service containers based on the work-breakdown structure.

In some embodiments, each of the service containers is at least one of a computing service container, a storage service container, and a network service container.

In some embodiments, the computing service container is associated with at least one of a virtual machine, a server, a resource cluster, a grid, and a resource pool.

In some embodiments, the storage service container is associated with at least one of a database, a filesystem, and a storage volume.

In some embodiments, resources are allocated to the network service container by:
(i) reserving network addresses and domain names for the network service container;
(ii) selecting a virtual network for use by the network service container; and
(iii) adding one or more computing service containers and one or more storage service containers to the network service container.

In some embodiments, using the work-breakdown structure to automatically provision the set of resources for use by the software offering further involves configuring the allocated resources for use by the software offering, and enabling monitoring of the allocated resources during deployment and execution of the software offering.

In some embodiments, the system also facilitates subsequent provisioning and use of the resources by tracking the deployment and execution of the software offering with a multidimensional model of the software offering.

BRIEF DESCRIPTION OF THE FIGURES

In the figures, like reference numerals refer to the same figure elements.

DETAILED DESCRIPTION

Figure 1:
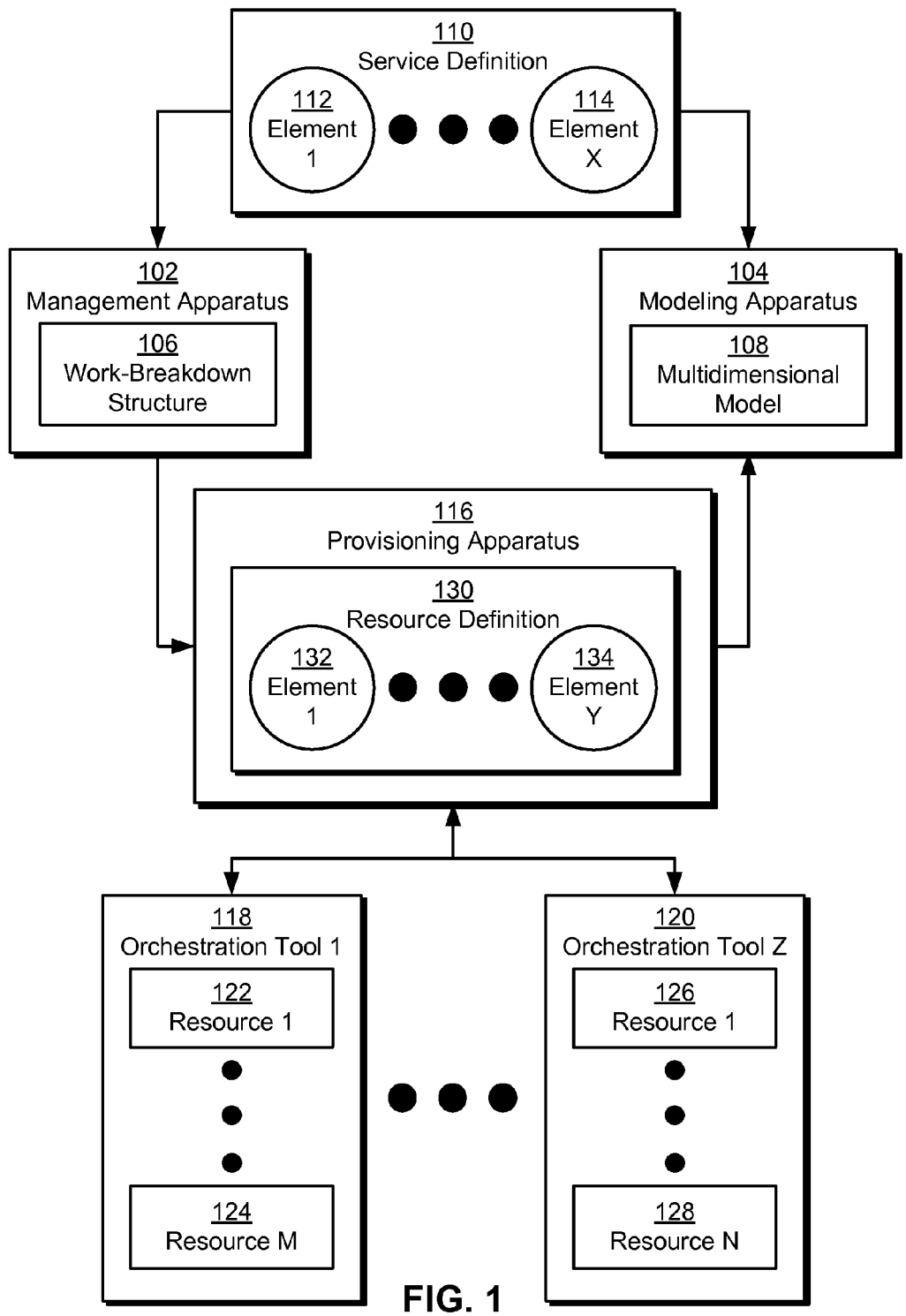
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the deployment and execution of a software offering. The software offering may correspond to an application that is deployed on one or more servers and accessed over a network connection. For example, the software offering may provide a web application, distributed application, and/or web service to users of the software offering.

More specifically, the disclosed embodiments provide a method and system for reducing complexity and/or overhead associated with the provisioning of resources to the software offering. First, a service definition of the software offering may be obtained. The service definition may include a topology and a set of policies. The policies may include a software-development-lifecycle policy, a security policy, a software-template policy, a quality-of-service (QoS) policy, and a structural policy. In other words, the service definition may define the architecture and functionality of the software offering.

Next, a work-breakdown structure may be created based on the policies from the service definition. For example, a set of requirements associated with the software offering may be determined from the service definition and stored in a tree structure corresponding to the work-breakdown structure. The work-breakdown structure may then be used to automatically provision a set of resources for use by the software offering without requiring manual configuration of the resources by a user. For example, nodes in the work-breakdown structure may be used to create service containers for hosting the software offering and to allocate resources to the service containers. The allocated resources may then be configured for use by the software offering, and monitoring of the allocated resources during deployment and execution of the software offering may be enabled.

FIG. 1 shows a schematic of a system in accordance with an embodiment. As shown in FIG. 1, the system includes a management apparatus 102, a modeling apparatus 104, and a provisioning apparatus 116. Each of these components is discussed in further detail below.

In one or more embodiments, the system of FIG. 1 is used to manage the deployment and execution of a software offering on a set of resources (e.g., resource 1 122, resource m 124, resource 1 126, resource n 128). The software offering may correspond to a software program that performs tasks for a set of users. For example, the software offering may allow the users to collaborate on projects, file income taxes, manage personal or small business finances, and/or perform data mining on a target data set.

Furthermore, the software offering may be implemented using a client-server architecture. Components of the software offering may be deployed and executed on one or more servers (e.g., in a data center) and accessed from other machines using a locally installed executable, a command-line interface, and/or a web browser and network connection. In other words, the software offering may be implemented using a cloud computing system that is accessed over the Internet.

To enable execution of the software offering, users associated with the creation, deployment, and/or execution of the software offering may determine a set of requirements associated with the software offering. The users may then allocate resources (e.g., resource 1 122, resource m 124, resource 1 126, resource n 128) in the cloud computing system to components in the software offering and configure the allocated resources in a way that allows the executing software offering to meet the requirements. For example, a development team for the software offering may provide a policy specifying a level of availability, reliability, scalability, security, and/or response time in the software offering. Administrators for the cloud computing system may ensure compliance with the policy by allocating sufficient infrastructure resources to the software offering and/or configuring the resources to provide requisite levels of redundancy, security, and/or load balancing in the software offering.

Those skilled in the art will appreciate that the cloud computing system may use virtualization to deploy and execute the software offering on a set of shared resources. In particular, a number of orchestration tools (e.g., orchestration tool 1 118, orchestration tool z 120) may be used to virtualize and/or provision different types of resources in the cloud computing system. For example, a virtual machine monitor may allocate and/or manage computing resources by creating and executing virtual machines as abstractions of physical servers. Similarly, a virtual filer may combine storage resources from a variety of storage devices into a resource pool and allocate logical volumes of storage from the resource pool. Finally, network routers and/or switches may partition network resources into virtual local area networks (VLANs) that connect physical and/or virtual computing and/or storage resources in the cloud computing system.

Moreover, each orchestration tool may include functionality to dynamically re-provision resources in response to changes in the software offering and/or in demand for the resources. For example, a virtual machine monitor may instantiate a new virtual machine to enable the addition of a new web server to the software offering. The virtual machine monitor may also allocate a set of physical computing resources (e.g., processor, memory, etc.) to the virtual machine to enable execution of the web server on the resources. Finally, the virtual machine monitor may move the virtual machine to a different set of physical resources if the web server's resource requirements change and/or the physical resources (e.g., servers) used to execute the web server become overloaded.

In other words, the use of resources by the software offering may be managed by a number of disparate, independently acting orchestration tools. As a result, the cloud computing system may lack a comprehensive view of dependencies between software components in the software offering and the hardware resources used to execute the software components. For example, the cloud computing system may lose track of resources allocated to the software offering once the orchestration tools begin reallocating and/or re-provisioning the resources.

Such lack of dependency information may cause problems with tracking and managing events and/or failures in the cloud computing system. For example, a server outage in the cloud computing system may require manual intervention by administrators to determine the set of hardware and software components affected by the outage and/or perform corrective actions that enable recovery from the server outage.

In one or more embodiments, the system of FIG. 1 reduces complexity associated with managing requirements and dependencies in the software offering by creating a multidimensional model 108 of the software offering and using multidimensional model 108 to manage the deployment and execution of the software offering. As shown in FIG. 1, multidimensional model 108 may be created from a service definition 110 of the software offering and a resource definition 130 of resources available for use by the software offering.

Service definition 110 may be obtained from a user (e.g., developer, architect, etc.) associated with the creation and/or development of the software offering. More specifically, service definition 110 may correspond to a logical representation of the software offering in terms of the software offering's configuration, topology, policies, and/or QoS attributes. As a result, elements (e.g., element 1 112, element x 114) of service definition 110 may include one or more tiers, a set of service components, and/or a set of connections. For example, an architect of the software offering may provide service definition 110 by inputting the number of tiers, level of security, software-development-lifecycle stage, and/or software stack associated with the software offering into a user interface provided by management apparatus 102.

On the other hand, resource definition 130 may be obtained from administrators and/or orchestration tools of the cloud computing system and correspond to a logical representation and/or division of available infrastructure resources in the cloud computing system in terms of the resources' locations, states, and/or utilization. Elements (e.g., element 1 132, element y 134) of resource definition 130 may thus represent physical and/or virtual resources, resource clusters, security zones, hosting segments, and/or locations in the cloud computing system. For example, an administrator may manually populate resource definition 130 with an inventory of physical and/or virtual resources in the cloud computing system, or provisioning apparatus 116 may receive notifications of changes to resources (e.g., addition of new resources, removal of existing resources) in the cloud computing system from the orchestration tools (e.g., virtual machine monitors, virtual filers) and update resource definition 130 accordingly.

To create multidimensional model 108, modeling apparatus 104 may map a first set of elements (e.g., element 1 112, element x 114) from service definition 110 to a second set of elements (e.g., element 1 132, element y 134) from resource definition 130. The mappings may represent dependencies of the first set of elements on the second set of elements. For example, a mapping from a service component in service definition 110 to a resource in resource definition 130 may indicate the allocation of the resource to the service component by an orchestration tool. Creation of multidimensional models for software offerings is discussed in a co-pending non-provisional application by the same inventors as the instant application and filed on the same day as the instant application, entitled "Multidimensional Modeling of Software Offerings," and having Ser. No. 13/031,950, which is incorporated herein by reference.

In one or more embodiments, the creation of multidimensional model 108 involves the identification of a set of requirements associated with the software offering from service definition 110, as well as the subsequent allocation of a subset of the resources from resource definition 130 to service components in service definition 110 based on the requirements. In particular, management apparatus 102 may determine the software offering's requirements from a set of policies in service definition 110 and store the requirements in a work-breakdown structure 106. The policies may include a software-development-lifecycle policy, a security policy, a software-template policy, a QoS policy, and/or a structural policy. The requirements may thus specify the amount and/or configuration of resources required to satisfy the policies.

Next, provisioning apparatus 116 may use work-breakdown structure 106 to automatically provision a set of resources for use by the software offering without requiring manual configuration of the resources by a user (e.g., administrator). For example, provisioning apparatus 116 may use work-breakdown structure 106 to create a set of service containers for hosting the software offering. Provisioning apparatus 116 may then allocate resources to the service containers by requesting the required amounts and/or configurations of resources from the corresponding orchestration tools. Provisioning of resources is discussed in further detail below with respect to FIG. 2.

As mentioned previously, multidimensional model 108 may include dependencies between service components in service definition 110 and resources in resource definition 130. Consequently, modeling apparatus 104 may create multidimensional model 108 by mapping resources allocated by provisioning apparatus 116 to the service components to which the resources were allocated.

Modeling apparatus 104 may also update the mappings based on changes to the provisioned resources. For example, resources provisioned to service components may change as new resources are allocated, currently allocated resources are de-allocated, and/or different sets of physical resources are used to execute virtualized resources (e.g., virtual machines, logical volumes, VLANs, etc.). Such changes may be obtained by provisioning apparatus 116 through querying and/or monitoring of the orchestration tools. The changes may also be used by provisioning apparatus 116 to update resource definition 130. The updates may then be propagated to multidimensional model 108 via modeling apparatus 104.

Because multidimensional model 108 contains an up-to-date representation of service components, resources, and dependencies in the software offering, the system of FIG. 1 may facilitate management of the software offering within the cloud computing system. For example, multidimensional model 108 may facilitate the automatic deployment of the software offering on the allocated resources, identification of resources allocated to the software offering, identification of failures during execution of the software offering, and/or management of changes associated with the software offering or the resources. In other words, the creation and update of multidimensional model 108 may reduce complexity and/or overhead associated with configuration management, fault diagnosis and remediation, deployment, and/or resource provisioning in the software offering.

Figure 2:
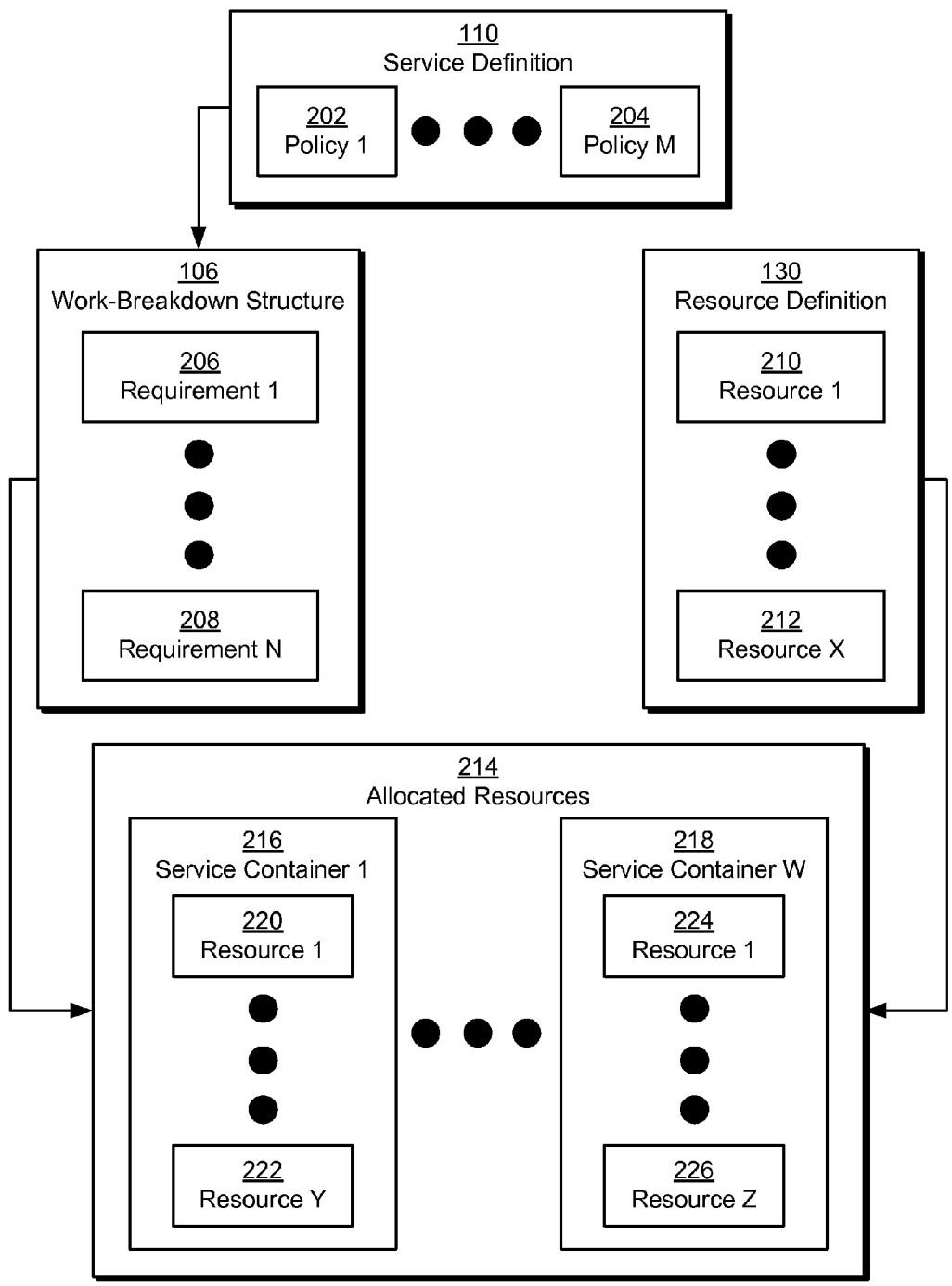
FIG. 2 shows the provisioning of resources to a software offering in accordance with an embodiment.

FIG. 2 shows the provisioning of resources to a software offering in accordance with an embodiment. To provision the resources, work-breakdown structure 106 may be created based on a set of policies (e.g., policy 1 202, policy m 204) from service definition 110. As discussed in the above-referenced application, the policies may be stored in one or more nodes (e.g., tier nodes, service nodes) of service definition 110. Furthermore, the policies may include a software-development-lifecycle policy, a structural policy, a security policy, a software-template policy, and/or a QoS policy.

The software-development-lifecycle policy may describe the current stage of the software offering's lifecycle. For example, the software-development-lifecycle policy may describe the stage as a "development stage," a "pre-production" stage, and/or a "production stage." Because different stages of the software offering's lifecycle require different amounts and/or configurations of resources, the software-development-lifecycle policy may influence the generation of work-breakdown structure 106 and the subsequent allocation of resources to the software offering. In addition, data collected during deployment and execution of one stage may be used to facilitate the allocation and configuration of resources for the next stage.

For example, a hosting segment in a data center may be divided into three sub-segments representing the development, pre-production, and production stages of the software development lifecycle. Resources may thus be provisioned and configured for use by the software offering within the sub-segment corresponding to the stage described in the software-development-lifecycle policy. Moreover, the software offering's use of the resources during the development stage may be monitored to determine the software offering's resource requirements for the pre-production stage, and the software offering's use of resources during the pre-production stage may be monitored to determine the software offering's resource requirements for the production stage.

The structural policy may describe the client-server architecture of the software offering. As mentioned in the above-referenced application, the structural policy may be obtained from the tier nodes in service definition 110. For example, one tier node may represent a single-tier architecture; three tier nodes may represent a three-tier architecture; and more than three tier nodes may represent a multi-tier architecture with more than one data, application, and/or presentation tier. The structural policy may thus affect the configuration of resources and/or service components along tier boundaries and/or data transfer between the tiers.

The security policy may indicate the level of security associated with each service component and/or tier in service definition 110. For example, the security policy may specify a high level of security and/or access control for a data tier and/or RDBMS service component, a moderate level of security and/or access control for an application tier and/or application server service component, and little to no security and/or access control for a presentation tier and/or web server service component.

In turn, the level of security for a given service component and/or tier may result in the provisioning of resources for the service component and/or tier from a specific security zone. Continuing with the above example, resources for the data tier and/or RDBMS service component may be provisioned from a secure zone within a hosting segment in a data center, resources for the application tier and/or application server service component may be provisioned from a non-secure zone within the hosting segment, and resources for the presentation tier and/or web server service component may be provisioned from a public zone within the hosting segment.

The software-template policy may describe the types of software to be used in the software offering. For example, the software-template policy may specify the use of a particular application server (e.g., JBoss (JBoss™ is a registered trademark of Red Hat, Inc.), Apache, Oracle), database (e.g., Oracle, PostgreSQL), web server (e.g., Apache Tomcat, IBM, Oracle), and/or operating system (e.g., Linux (Linux™ is a registered trademark of Linus Torvalds), Solaris (Solaris™ is a registered trademark of Oracle America, Inc.)) in the software offering.

Alternatively, the software-template policy may specify parameters that are used to select a software stack for use by the software offering. For example, the software-template policy may indicate the software platform used to develop the software offering (e.g., Java (Java™ is a registered trademark of Oracle America, Inc.), .NET). A software stack containing an application server, web server, and database may then be selected based on the software platform in the software-template policy and the number of tiers in the structural policy.

The QoS policy may include a number of requirements associated with reliability, availability, scalability, and/or response time in the software offering. The QoS policy may be inferred from the structure of service definition 110. For example, service definition 110 may indicate the need for a certain reliability and/or availability by specifying the use of multiple application servers, web servers, and/or databases in the software offering. On the other hand, the QoS policy may be explicitly stated in service definition 110. For example, a node in service definition 110 may specify an availability of five nines and a response time of less than one second for a web server corresponding to the node.

To create work-breakdown structure 106, a set of requirements (e.g., requirement 1 206, requirement n 208) associated with the software offering may be determined from the policies and stored in a tree structure. As a result, the leaf nodes of the tree structure may correspond to a conceptual allocation of resources to the software offering, and the hierarchy of the tree structure may reflect the policies in service definition 110. Work-breakdown structure 106 is discussed in further detail below with respect to FIG. 3.

Next, work-breakdown structure 106 may be used to automatically provision a set of resources (e.g., allocated resources 214) for use by the software offering. First, the requirements in work-breakdown structure 106 may be compared with a set of available resources (e.g., resource 1 210, resource x 212) from resource definition 130 to determine if the available resources are sufficient to meet the requirements. If the software offering cannot be provisioned adequately using the available resources, the software offering is not provisioned from the available resources.

If the software offering can be sufficiently provisioned from the available resources, a set of service containers (e.g., service container 1 216, service container w 218) is created to host the software offering, and resources (e.g., resource 1 220, resource y 222, resource 1 224, resource z 226) are allocated to the service containers based on work-breakdown structure 106. Each service container may correspond to an abstraction of computing, storage, network, and/or software (e.g., service component) resources required for deployment and execution of the software offering. For example, a service container may contain one or more virtualized and/or physical resources used to execute a service component (e.g., application server, web server, database, operating system) in the software offering. Service containers may also contain other service containers to allow a service component hosted in one service container to use another service component hosted in a different service container as a resource. In other words, the creation of service containers may be based on the dependencies between service components in service definition 110.

In one or more embodiments, each service container is a computing service container, a storage service container, and/or a network service container. Each computing service container may be associated with (e.g., contain) a computing resource such as a virtual machine, a server, a resource cluster, a grid, and/or a resource pool. Similarly, each storage service container may be associated with a storage resource such as a database, filesystem, and/or storage volume. Computing and/or storage resources may be allocated to the respective service containers by requesting the resources from the corresponding orchestration tools. For example, a virtual machine may be allocated to a computing service container by requesting the virtual machine from a virtual machine monitor. Similarly, a logical volume may be allocated to a storage service container by requesting the logical volume from a virtual filer.

On the other hand, resources may be allocated to a network resource container by reserving network addresses (e.g., Internet Protocol (IP) addresses) and domain names for the network service container, selecting a virtual network (e.g., VLAN) for use by the network service container, and adding one or more computing service containers and one or more storage service containers to the network service container. For example, a secure zone may be created for use by the software offering by reserving a number of internal IP addresses and/or Domain Name System (DNS) entries for a network service container, adding a pre-created private VLAN to the network service container, and adding one or more virtual machines and/or logical volumes to the network service container.

As mentioned previously, policies in service definition 110 may influence the creation of work-breakdown structure 106 and, in turn, the subsequent allocation of resources to the software offering. For example, a QoS policy in service definition 110 may require that the software offering include a web server with high availability and performance. The QoS policy may result in the creation of a node in work-breakdown structure 106 for allocating a computing resource from a high-performance resource cluster in a data center. Finally, the allocation of resources based on work-breakdown structure 106 may cause a virtual machine to be instantiated in the high-performance resource cluster.

After resource allocation is complete, allocated resources 214 may be configured for use by the software offering, and monitoring of allocated resources 214 during deployment and execution of the software offering may be enabled. For example, a software stack (e.g., operating system, RDBMS, application server, web server) may be loaded into one or more service containers to enable deployment of the software offering into the service containers. A monitoring system may also be configured to assess the performance and behavior of the software offering during execution of the software offering.

Finally, allocated resources 214 may be used to update resource definition 130 and/or enable subsequent deployment of the software offering. For example, allocated resources 214 may be removed from a set of available resources in resource definition 130 to maintain an up-to-date view of resources in resource definition 130. An email may also be sent to a development team for the software offering to notify the development team of the readiness to deploy the software offering on allocated resources 214.

Allocated resources 214 may also be used to create a multidimensional model (e.g., multidimensional model 108 of FIG. 1) of the software offering. The multidimensional model may be used to facilitate the provisioning and use of allocated resources 214 by tracking the deployment and execution of the software offering. For example, the multidimensional model may be updated to reflect changes to service definition 110, resource definition 130, and/or dependencies between service components in service definition 110 and resources in resource definition 130. As a result, the multidimensional model may enable identification of the allocated resources, automatic deployment of the software offering on the allocated resources, identification of failures during execution of the software offering, and/or management of changes associated with the software offering and/or resources.

Figure 3:
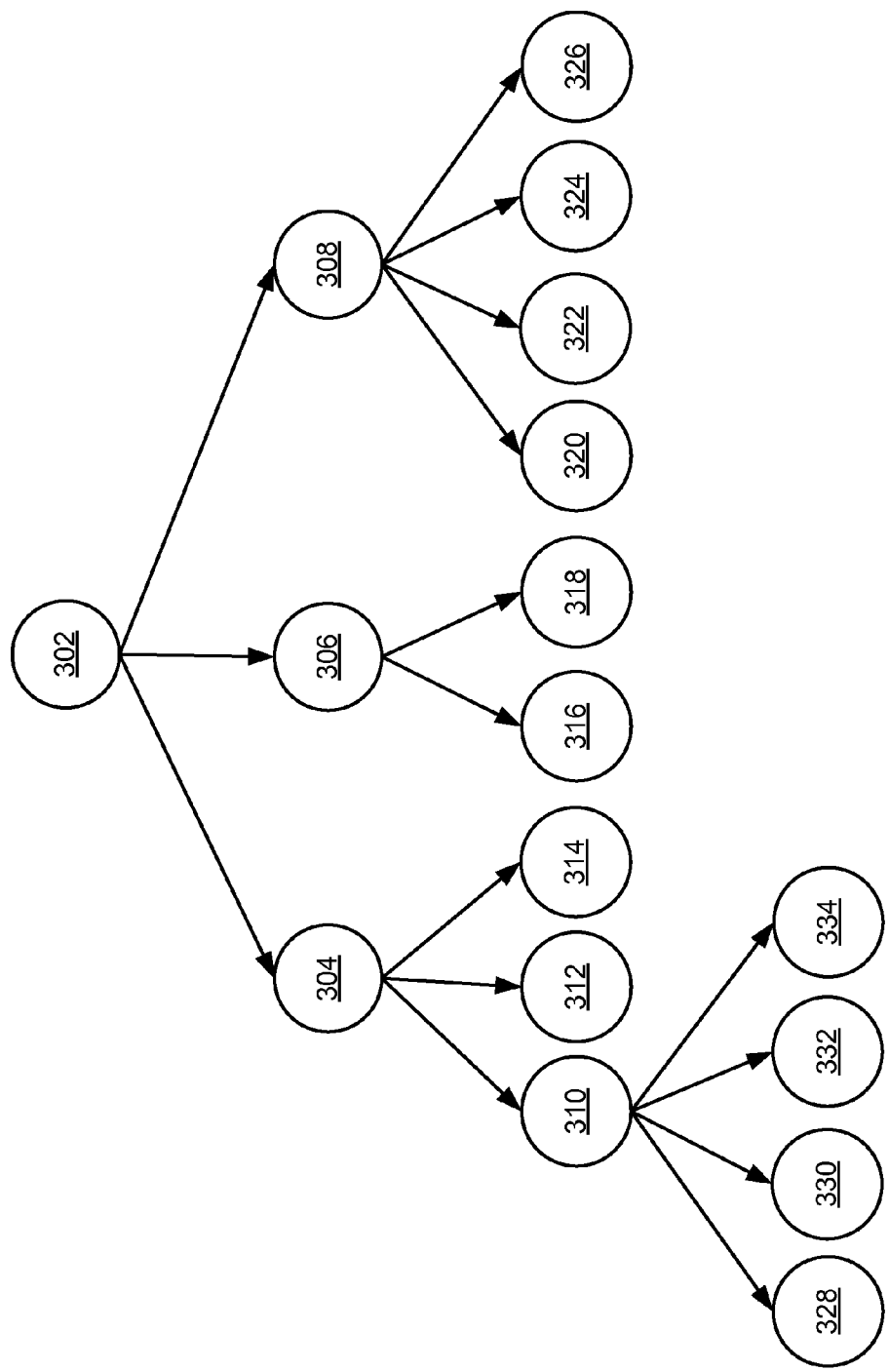
FIG. 3 shows a work-breakdown structure for provisioning a software offering in accordance with an embodiment.

FIG. 3 shows a work-breakdown structure for provisioning a software offering in accordance with an embodiment. As discussed above, the work-breakdown structure may be created from a set of policies in a service definition for the software offering. The work-breakdown structure may then be used to provision a set of resources for use by the software offering. Consequently, the work-breakdown structure may correspond to a tree structure that divides the task of provisioning resources for the software offering into a set of requirements and/or discrete work elements.

As shown in FIG. 3, the work-breakdown structure includes a set of nodes 302-334, beginning with a root node 302 representing the task of provisioning resources for use by the software offering. Furthermore, connections from root node 302 to nodes 304-334 may represent the subdivision of the provisioning task into three additional levels, with each level representing a further division of tasks represented by nodes from the previous level.

At the second level, the connection of root node 302 to three child nodes 304-308 may represent the division of the provisioning task into three subtasks. Next, a third level of division is represented by a set of connections between nodes 304-308 and nodes 310-326. In particular, node 304 is connected to three child nodes 310-314, node 306 is connected to two child nodes 316-318, and node 308 is connected to four child nodes 320-326. Finally, a fourth level of task division is represented by the connection of node 310 to four child nodes 328-334.

Nodes 304-308 in the second level may represent the provisioning of resources based on different attributes of the resources. For example, nodes 304-308 may correspond to security zones (e.g., secure, non-secure, public), tiers (e.g., presentation, application, data), resource types (e.g., computing, network, storage), and/or locations (e.g., data centers, hosting segments, resource clusters) associated with the resources.

Nodes 310-326 in the third level may denote the continued division of the subtasks into smaller subtasks. Furthermore, node 310 may correspond to the only non-child node in the third level. As a result, the remaining nodes 312-326 may be used to allocate resources to the software offering. In other words, nodes 312-326 may contain requirements of the software offering and/or represent a conceptual allocation of resources to the software offering. For example, nodes 312-326 may be used to allocate virtual machines, logical volumes, and/or virtual networks to the software offering. In addition, resources corresponding to nodes 312-326 may be allocated and/or configured for use in a number of hosting segments, security zones, and/or networks represented by nodes 304-308. For example, nodes 312-314 may be used to allocate resources within a secure zone represented by node 304, nodes 316-318 may be used to allocate resources within a non-secure zone represented by node 306, and nodes 320-326 may be used to allocate resources within a public zone represented by node 308.

Finally, nodes 328-334 in the fourth level may represent the smallest subtasks in the provisioning task. For example, nodes 328-334 may be used to reserve and/or allocate IP addresses for the software offering, node 310 may represent a network, and node 304 may represent a high-performance hosting segment. As a result, nodes 312-314 may be used to allocate virtual machines and/or logical volumes with high-availability and/or response-time requirements within the network represented by node 310 and/or the hosting segment represented by node 304. Along the same lines, nodes 316-326 may be used to allocate virtual machines and/or logical volumes to the software offering from two other hosting segments corresponding to nodes 306-308, respectively.

To allocate resources using the work-breakdown structure, service containers corresponding to child nodes 312-334 may be created, and resources may be allocated to the service containers using information associated with child nodes 312-334 and/or other nodes 302-310 of the work-breakdown structure. The allocated resources may then be configured to host service components associated with the software offering. Continuing with the previous example, a set of IP addresses corresponding to nodes 328-334 may be reserved and added to a network service container corresponding to node 310 and/or hosting segment corresponding to node 304. Next, logical volumes corresponding to nodes 312-314 may be allocated, added to the same network service container, and configured for use by the software offering. Virtual machines corresponding to nodes 316-326 may then be allocated and instantiated from two other hosting segments represented by nodes 306-308. The logical volumes may be attached to the virtual machines, and a software stack may be loaded into the virtual machines to enable deployment of the software offering on the virtual machines. Finally, monitoring of the software offering may be enabled by providing identifiers for the instantiated and/or allocated resources to a monitoring system.

Figure 4:
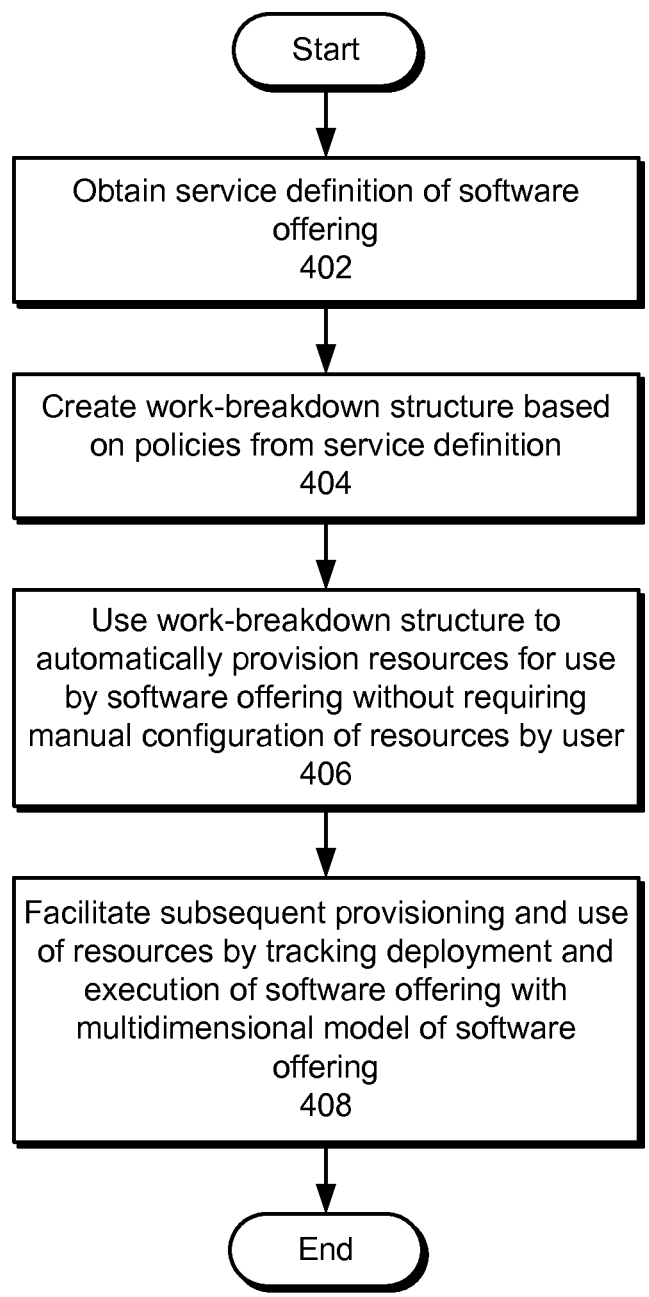
FIG. 4 shows a flowchart illustrating the process of facilitating the deployment and execution of a software offering in accordance with an embodiment.

FIG. 4 shows a flowchart illustrating the process of facilitating the deployment and execution of a software offering in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, a service definition of a software offering is obtained (operation 402). The service definition may correspond to a logical representation of the software offering in terms of the software offering's configuration, topology, and/or policies. Next, a work-breakdown structure is created based on a set of policies from the service definition (operation 404). The work-breakdown structure may be created by determining a set of requirements associated with the software offering from the policies in the service definition and storing the requirements in a tree structure.

The work-breakdown structure is then used to automatically provision a set of resources for use by the software offering without requiring manual configuration of the resources by the user (operation 406). Automatic provisioning of resources from a work-breakdown structure is discussed in further detail below with respect to FIG. 5.

Finally, subsequent provisioning and use of the resources is facilitated by tracking the deployment and execution of the software offering with a multidimensional model of the software offering (operation 408). The multidimensional model may provide a comprehensive view of service components, resources, and dependencies in the software offering. As a result, the multidimensional model may enable identification of the provisioned resources, automatic deployment of the software offering on the provisioned resources, identification of failures during execution of the software offering, and/or management of changes associated with the software offering and/or resources.

Figure 5:
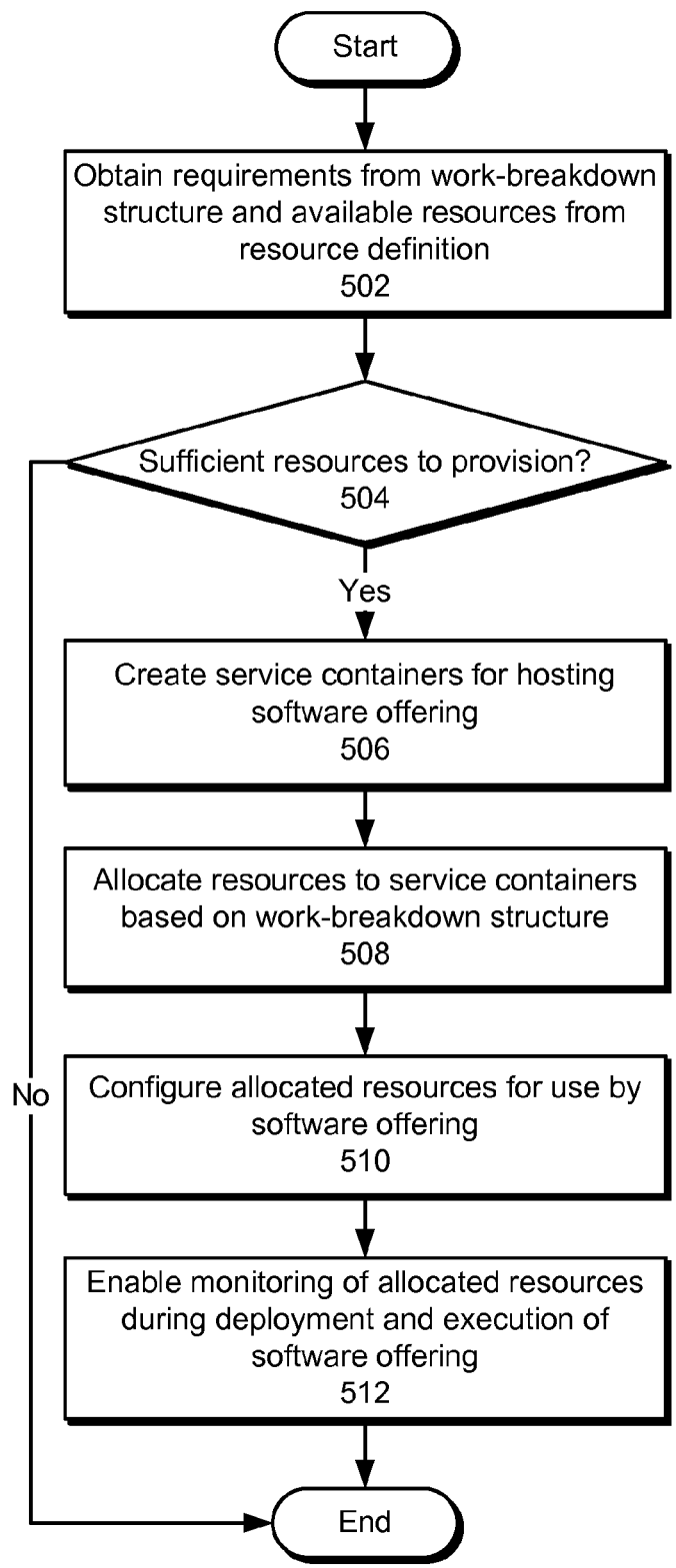
FIG. 5 shows a flowchart illustrating the process of using a work-breakdown structure to automatically provision a set of resources for use by a software offering in accordance with an embodiment.

FIG. 5 shows a flowchart illustrating the process of using a work-breakdown structure to automatically provision a set of resources for use by a software offering in accordance with an embodiment. In one or more embodiments, one or more of the steps may be omitted, repeated, and/or performed in a different order. Accordingly, the specific arrangement of steps shown in FIG. 5 should not be construed as limiting the scope of the technique.

Initially, a set of requirements is obtained from the work-breakdown structure, and a set of available resources is obtained from a resource definition (operation 502). The requirements may specify the amount and/or configuration of resources to be used by the software offering. In addition, the requirements and available resources may be used to determine if the available resources are sufficient to provision the software offering (operation 504). If the available resources are not sufficient, the software offering is not provisioned from the available resources.

If the available resources are sufficient, a set of service containers for hosting the software offering is created (operation 506). The service containers may correspond to computing, network, and/or storage service containers. Next, resources are allocated to the service containers based on the work-breakdown structure (operation 508). For example, computing resources may be allocated to a computing service container from one or more virtual machines, servers, resource clusters, grids, and/or resource pools. Storage resources may be allocated to a storage service container from one or more databases, filesystems, and/or storage volumes. Finally, resources may be allocated to the network service container from a set of network addresses and/or domain names, a set of virtual networks, and a set of computing and/or storage service containers.

The allocated resources may then be configured for use by the software offering (operation 510). For example, a software stack containing an operating system, RDBMS, application server, and web server may be loaded into the allocated resources to enable deployment of the software offering onto the allocated resources. Storage resources may also be attached to computing resources to enable data transfer between the two types of resources. Finally, monitoring of the allocated resources during deployment and execution of the software offering is enabled (operation 512). For example, resource identifiers for the allocated resources may be provided to a monitoring system to allow the monitoring system to assess the behavior and/or performance of the allocated resources and/or corresponding service components during execution of the software offering.

Figure 6:
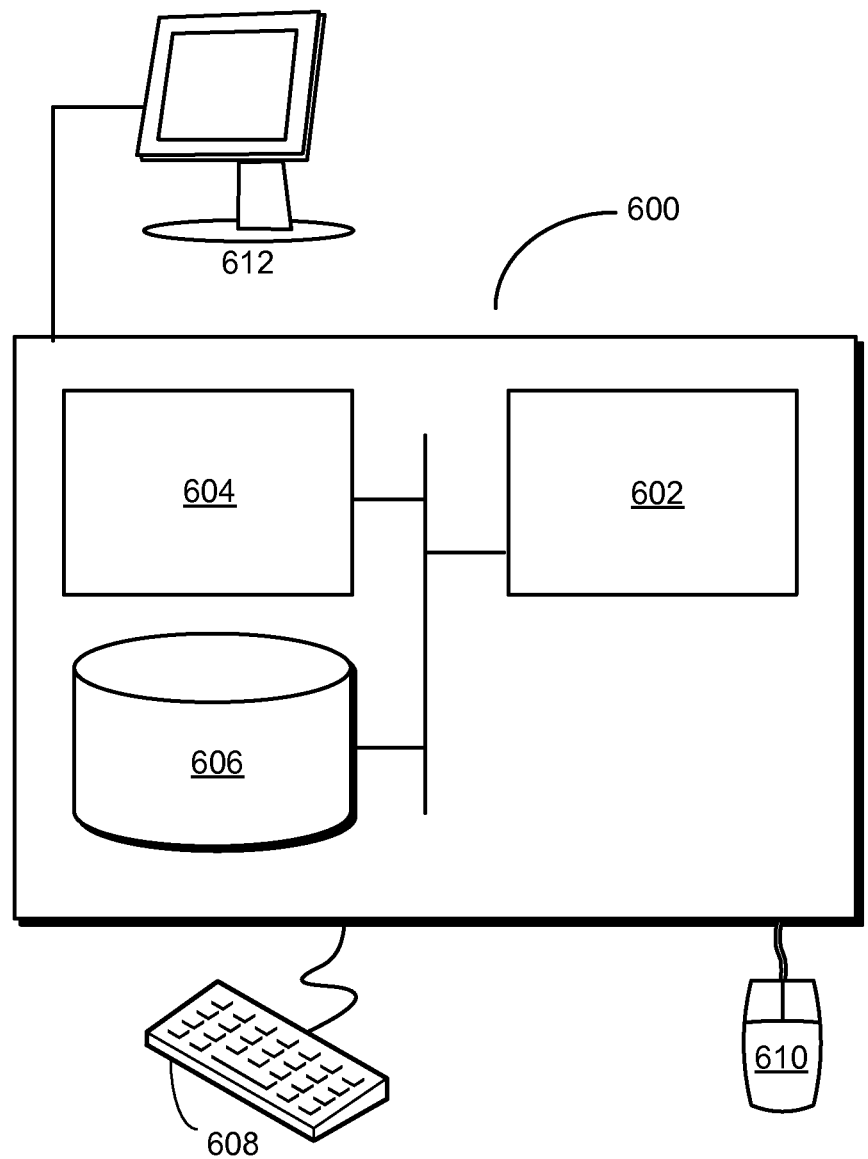
FIG. 6 shows a computer system in accordance with an embodiment.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an OS (not shown) that coordinates the use of hardware and software resources on computer system 600, as well as one or more applications that perform specialized tasks for the user. To perform tasks for the user, applications may obtain the use of hardware resources on computer system 600 from the OS, as well as interact with the user through a hardware and/or software framework provided by the OS.

In particular, computer system 600 may provide a system for facilitating the deployment and execution of a software offering. The system may include a management apparatus that obtains a service definition of the software offering and creates a work-breakdown structure based on a set of policies from the service definition. The system may also include a provisioning apparatus that uses the work-breakdown structure to automatically provision a set of resources for use by the software offering without requiring manual configuration of the resources by a user.

In addition, one or more components of computer system 600 may be remotely located and connected to the other components over a network. Portions of the present embodiments (e.g., management apparatus, provisioning apparatus, etc.) may also be located on different nodes of a distributed system that implements the embodiments. For example, the present embodiments may be implemented using a cloud computing system that uses a service definition of a software offering to automatically provision a set of resources for use by the software offering.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the deployment and execution of a software offering, comprising:
   obtaining a service definition of the software offering;
   creating a work-breakdown structure based on a set of policies from the service definition; and
   using the work-breakdown structure to automatically provision a set of resources for use by the software offering without requiring manual configuration of the resources by a user, wherein using the work-breakdown structure to automatically provision the set of resources comprises:
      creating a set of service containers for hosting the software offering, wherein each of the service containers is at least one of a computing service container, a storage service container, and a network service container; and
      allocating resources to the service containers based on the work-breakdown structure by:
         reserving network addresses and domain names for the network service container;
         selecting a virtual network for use by the network service container; and
         adding one or more computing service containers and one or more storage service containers to the network service container.

2. The computer-implemented method of claim 1, wherein each of the set of policies is at least one of a software-development-lifecycle policy, a security policy, a software-template policy, a quality-of-service (QoS) policy, and a structural policy.

3. The computer-implemented method of claim 1, wherein creating the work-breakdown structure based on the set of policies involves:
   determining a set of requirements associated with the software offering from the set of policies; and
   storing the requirements in a tree structure.

4. The computer-implemented method of claim 1, wherein the computing service container is associated with at least one of a virtual machine, a server, a resource cluster, a grid, and a resource pool.

5. The computer-implemented method of claim 1, wherein the storage service container is associated with at least one of a database, a filesystem, and a storage volume.

6. The computer-implemented method of claim 1, wherein using the work-breakdown structure to automatically provision the set of resources for use by the software offering further involves:
   configuring the allocated resources for use by the software offering; and
   enabling monitoring of the allocated resources during deployment and execution of the software offering.

7. The computer-implemented method of claim 1, further comprising:
   facilitating subsequent provisioning and use of the resources by tracking the deployment and execution of the software offering with a multidimensional model of the software offering.

8. The computer-implemented method of claim 1, wherein the set of policies comprises a software-development-lifecycle policy, and wherein creating the work-breakdown structure comprises using the software-development-lifecycle policy.

9. A system for facilitating the deployment and execution of a software offering, comprising:
   a management apparatus configured to:
      obtain a service definition of the software offering; and
      create a work-breakdown structure based on a set of policies from the service definition; and
   a provisioning apparatus configured to use the work-breakdown structure to automatically provision a set of resources for use by the software offering without requiring manual configuration of the resources by a user, wherein, while using the work-breakdown structure to automatically provision the set of resources, the provisioning apparatus is configured to:
      create a set of service containers for hosting the software offering, wherein each of the service containers is at least one of a computing service container, a storage service container, and a network service container; and
      allocate resources to the service containers based on the work-breakdown structure by:
         reserving network addresses and domain names for the network service container;
         selecting a virtual network for use by the network service container; and
         adding one or more computing service containers and one or more storage service containers to the network service container.

10. The system of claim 9, wherein each of the set of policies is at least one of a software-development-lifecycle policy, a security policy, a software-template policy, a quality-of-service (QoS) policy, and a structural policy.

11. The system of claim 9, wherein the computing service container is associated with at least one of a virtual machine, a server, a cluster, a grid, and a resource pool.

12. The system of claim 9, wherein the storage service container is associated with at least one of a database, a filesystem, and a storage volume.

13. The system of claim 9, wherein using the work-breakdown structure to automatically provision the set of resources for use by the software offering further involves:

configuring the allocated resources for use by the software offering; and enabling monitoring of the allocated resources during deployment and execution of the software offering.

14. The system of claim 9, wherein the set of policies comprises a software-development-lifecycle policy, and wherein creating the work-breakdown structure comprises using the software-development-lifecycle policy.

15. A non-transitory computer-readable storage medium storing instructions that when executed by a computer cause the computer to perform a method for facilitating the deployment and execution of a software offering, the method comprising:

obtaining a service definition of the software offering;

creating a work-breakdown structure based on a set of policies from the service definition; and using the work-breakdown structure to automatically provision a set of resources for use by the software offering without requiring manual configuration of the resources by a user, wherein using the work-breakdown structure to automatically provision the set of resources comprises:

creating a set of service containers for hosting the software offering, wherein each of the service containers is at least one of a computing service container, a storage service container, and a network service container; and allocating resources to the service containers based on the work-breakdown structure by:

reserving network addresses and domain names for the network service container;

selecting a virtual network for use by the network service container; and adding one or more computing service containers and one or more storage service containers to the network service container.

16. The computer-readable storage medium of claim 15, wherein the computing service container is associated with at least one of a virtual machine, a server, a cluster, a grid, and a resource pool.

17. The computer-readable storage medium of claim 15, wherein the storage service container is associated with at least one of a database, a filesystem, and a storage volume.

18. The computer-readable storage medium of claim 15, wherein using the work-breakdown structure to automatically provision the set of resources for use by the software offering further involves:

configuring the allocated resources for use by the software offering; and enabling monitoring of the allocated resources during deployment and execution of the software offering.

19. The computer-readable storage medium of claim 15, wherein the set of policies comprises a software-development-lifecycle policy, and wherein creating the work-breakdown structure comprises using the software-development-lifecycle policy.

* * * * *